(12) United States Patent
Jiang et al.

(10) Patent No.: US 8,642,909 B2
(45) Date of Patent: Feb. 4, 2014

(54) TOUCH PANEL

(75) Inventors: Yau-Chen Jiang, Hsinchu County (TW);
Jeng-Maw Chiou, Hsinchu County
(TW); Ting-Chieh Chien, Hsinchu
County (TW)

(73) Assignee: Unidisplay Inc., Hsinchu County (TW)

( * ) Notice: Subject to any disclaimer, the term of this patent is extended or adjusted under 35 U.S.C. 154(b) by 208 days.

(21) Appl. No.: 13/344,618

(22) Filed: Jan. 6, 2012

(65) Prior Publication Data
US 2012/0175235 A1 Jul. 12, 2012

(30) Foreign Application Priority Data

Jan. 7, 2011 (TW) .............................. 100100668 A

(51) Int. Cl.
*H03K 17/975* (2006.01)
(52) U.S. Cl.
USPC ........................................................ 200/600
(58) Field of Classification Search
USPC ........................................................ 200/600
See application file for complete search history.

(56) References Cited

U.S. PATENT DOCUMENTS

| | | | | | |
|---|---|---|---|---|---|
| 7,439,466 | B2 * | 10/2008 | Yamaue et al. | ............... | 200/512 |
| 8,049,127 | B2 * | 11/2011 | Yamaue et al. | ............... | 200/512 |
| 2011/0057893 | A1 * | 3/2011 | Kim et al. | ..................... | 345/173 |
| 2012/0086669 | A1 * | 4/2012 | Kim et al. | ..................... | 345/174 |
| 2012/0206376 | A1 * | 8/2012 | Lin | ............................... | 345/173 |

* cited by examiner

*Primary Examiner* — Kyung Lee
(74) *Attorney, Agent, or Firm* — Jianq Chyun IP Office

(57) ABSTRACT

A touch panel includes a substrate, a first and a second patterned conductive layers respectively disposed on an upper surface of the substrate and a lower surface opposite to the upper surface. The substrate has a first sensing area and a first circuit bonding area located on the upper surface. The first patterned conductive layer includes a plurality of first sensing series and a plurality of first dummy patterns respectively located in the first sensing area and the first circuit bonding area. Each of the first sensing series is electrically insulated from each other and has a first terminal extending into the first circuit bonding area. The first dummy patterns surround each first terminal and are electrically insulated from each first terminal. A plurality of first dummy patterns intervenes between any two adjacent first terminals in the first circuit bonding area.

22 Claims, 11 Drawing Sheets

TOUCH PANEL

CROSS-REFERENCE TO RELATED APPLICATION

This application claims the priority benefit of Taiwan application serial no. 100100668, filed on Jan. 7, 2011. The entirety of the above-mentioned patent application is hereby incorporated by reference herein and made a part of this specification.

BACKGROUND OF THE INVENTION

1. Field of the Invention

The disclosure is related to a touch panel, and in particular to a capacitive touch panel.

2. Description of Related Art

In recent years, with the rapid development and application of informational technology, wireless mobile communication, and informational household appliances, in order to achieve purposes of higher portability, smaller volume, and greater user-friendliness, a plurality of informational products have been converted from using conventional input devices such as keyboards and mice to using touch devices. According to their sensing methods, touch panels may be generally classified into resistive touch panels, capacitive touch panels, optical touch panels, sound wave touch panel, and electromagnetic touch panels. Since capacitive touch panels have advantages such as fast response times, high reliability, and great durability, they have become widely used in electronic products.

Generally, a capacitive touch panel includes a plurality of first sensing series and a plurality of second sensing series which are electrically insulated from each other. When a user touches the touch panel with his or her finger, a change in capacitance between the first sensing series and the second sensing series is generated at a location in contact with the finger. This change in capacitance is converted into a control signal, transmitted to an external circuit, processed, and output as a suitable command to operate an electronic device. In order to let the control signal of capacitance change be transmitted to the external circuit, a flexible printed circuit is usually electrically connected between each of the sensing series on the touch panel and the external circuit (such as a control circuit board). In other words, each pin on the flexible printed circuit is aligned with a terminal of each of the sensing series, and the flexible printed circuit is adhered to the terminals of the sensing series, so that each of the pins on the flexible printed circuit contacts the terminal of each of the sensing series. However, when misalignment occurs, each of the pins on the flexible printed circuit contacts a conductive layer at a periphery of the terminals of the sensing series. The conductive layer causes abnormal short circuits between different sensing series, thereby leading to lower production yields of touch panels.

SUMMARY OF THE INVENTION

The disclosure provides a touch panel which includes a plurality of dummy patterns located in a circuit bonding area.

The disclosure provides a touch panel which includes a substrate, a first patterned conductive layer, and a second patterned conductive layer. The substrate includes an upper surface, a first sensing area, a first circuit bonding area, and a lower surface opposite to the upper surface. The first sensing area and the first circuit bonding area are located on the upper surface. The first patterned conductive layer is located on the upper surface, and the second patterned conductive layer is located on the lower surface. The first patterned conductive layer includes a plurality of first sensing series located in the first sensing area and a plurality of first dummy patterns located in the first circuit bonding area. Each of the first sensing series is electrically insulated from each other and has a first terminal extending into the first circuit bonding area. The first dummy patterns surround each of the first terminals and are electrically insulated from each of the first terminals. In the first circuit bonding area, there is a plurality of the dummy patterns between every two adjacent first terminals.

According to an embodiment of the disclosure, a distance from each of the first terminals to the adjacent first dummy pattern is from 10 μm to 200 μm, and a distance between two adjacent first dummy patterns is from 10 μm to 200 μm.

According to an embodiment of the disclosure, the first circuit bonding area includes a first area and a second area. The first area surrounds the first terminals and is sandwiched between the first terminals and the second area. An average size of first dummy patterns in the first area is smaller than an average size of first dummy patterns in the second area.

According to an embodiment of the disclosure, the first patterned conductive layer further includes a plurality of first dummy conductive patterns, and each of the first dummy conductive patterns is located between two adjacent first sensing series and is electrically insulated from the first sensing series.

According to an embodiment of the disclosure, the substrate includes a first peripheral area located on the upper surface, the first patterned conductive layer further includes a plurality of first dummy peripheral patterns, and the first dummy peripheral patterns are located in the first peripheral area and electrically insulated from the first sensing series.

According to an embodiment of the disclosure, the substrate includes a second sensing area and a second circuit bonding area which are located on the lower surface. The second patterned conductive layer includes a plurality of second sensing series located in the second sensing area and a plurality of second dummy patterns located in the second circuit bonding area. Each of the second sensing series is electrically insulated from each other and has a second terminal extending into the second circuit bonding area. The second dummy patterns surrounding each of the second terminals and is electrically insulated from each of the second terminals, and in the second circuit bonding area, a plurality of the second dummy patterns are located between two adjacent second terminals.

According to an embodiment of the disclosure, a distance from each of the second terminals to the adjacent second dummy pattern is from 10 μm to 200 μm, and a distance between two adjacent second dummy patterns is from 10 μm to 200 μm.

According to an embodiment of the disclosure, the second circuit bonding area includes a third area and a fourth area. The third area surrounds the second terminals and is sandwiched between the second terminals and the fourth area. An average size of second dummy patterns in the third area is smaller than an average size of second dummy patterns in the fourth area.

According to an embodiment of the disclosure, the second patterned conductive layer further includes a plurality of second dummy conductive patterns, and each of the second dummy conductive patterns is located between two adjacent second sensing series and is electrically insulated from the second sensing series.

According to an embodiment of the disclosure, the substrate includes a second peripheral area located on the upper surface, the second patterned conductive layer further includes a plurality of second dummy peripheral patterns, and the second dummy peripheral patterns are located in the second peripheral area and electrically insulated from the second sensing series.

According to an embodiment of the disclosure, materials of the first patterned conductive layer and the second patterned conductive layer include transparent conductive materials.

The disclosure provides another touch panel which includes a substrate, a first patterned conductive layer, and a second patterned conductive layer. The substrate includes an upper surface, a first sensing area, a first circuit bonding area, and a lower surface opposite to the upper surface. The first sensing area and the first circuit bonding area are located on the upper surface. The first patterned conductive layer is located on the upper surface, and the second patterned conductive layer is located on the lower surface. The first patterned conductive layer includes a plurality of first isolation trenches located in the first sensing area and a plurality of second isolation trenches located in the first circuit bonding area. The first isolation trenches define a plurality of first sensing series electrically insulated from each other and first dummy conductive patterns. The second isolation trenches communicate with the first isolation trenches, so as to define a plurality of first terminals connected to the first sensing series and a plurality of the first dummy patterns surrounding each of the first terminals. A plurality of the first dummy patterns is located between two adjacent first terminals.

According to an embodiment of the disclosure, an extension direction of each of the second isolation trenches may be horizontal, vertical, or oblique.

According to an embodiment of the disclosure, a width of each of the first isolation trenches and the second isolation trenches is from 10 μm to 200 μm.

According to an embodiment of the disclosure, the first circuit bonding area includes a first area and a second area, the first area surrounds the first terminals and are located between the first terminals and the second area, and a distribution density of the second isolation trenches in the first area is greater than a distribution density of the second isolation trenches in the second area.

According to an embodiment of the disclosure, the substrate includes a first peripheral area located on the upper surface, the first patterned conductive layer includes a plurality of first peripheral isolation trenches located in the first peripheral area, the first peripheral isolation trenches define a plurality of first dummy peripheral patterns, and the first peripheral patterns and the first sensing series are electrically insulated from each other.

According to an embodiment of the disclosure, the substrate includes a second sensing area and a second circuit bonding area which are located on the lower surface. The second patterned conductive layer includes a plurality of third isolation trenches located in the second sensing area and a plurality of fourth isolation trenches located in the second circuit bonding area. The third isolation trenches define a plurality of second sensing series electrically insulated from each other and second dummy conductive patterns.

According to an embodiment of the disclosure, an extension direction of each of the fourth isolation trenches may be horizontal, vertical, or oblique.

According to an embodiment of the disclosure, a width of each of the third isolation trenches and the fourth isolation trenches is from 10 μm to 200 μm.

According to an embodiment of the disclosure, the second circuit bonding area includes a third area and a fourth area. The third area surrounds the second terminals and is sandwiched between the second terminals and the fourth area. A distribution density of the fourth isolation trenches in the third area is greater than a distribution density of the fourth isolation trenches in the fourth area.

According to an embodiment of the disclosure, the substrate includes a second peripheral area located on the lower surface, the second patterned conductive layer includes a plurality of second peripheral isolation trenches located in the second peripheral area, the second peripheral isolation trenches define a plurality of second dummy peripheral patterns, and the second dummy peripheral patterns and the second sensing series are electrically insulated from each other.

According to an embodiment of the disclosure, materials of the first patterned conductive layer and the second patterned conductive layer include transparent conductive materials.

The disclosure provides still another touch panel which includes a substrate, a first patterned conductive layer, and a second patterned conductive layer. The substrate includes an upper surface, a first sensing area, a first circuit bonding area, and a lower surface opposite to the upper surface. The first sensing area and the first circuit bonding area are located on the upper surface. The first patterned conductive layer is located on the upper surface, and the second patterned conductive layer is located on the lower surface. The first patterned conductive layer includes a plurality of first sensing series and a plurality of isolation trenches which electrically insulate the first sensing series from each other. The first sensing series are located in the first sensing area, and each of the first sensing series is electrically insulated from each other and includes a first terminal extending into the first circuit bonding area. The isolation trenches are formed by a plurality of repeating patterns.

According to an embodiment of the disclosure, shape of each of the repeating patterns includes a circle, an oval, or a rectangle.

In light of the above, the touch panel according to the disclosure includes in the circuit bonding area the plurality of dummy patterns electrically insulated from each other and surrounding the terminals of the sensing series, so as to effectively prevent problems of short circuits caused by misalignment between pins on a circuit layer and the terminals of the sensing series. Therefore, the touch panel according to the disclosure facilitates increase of production yield.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
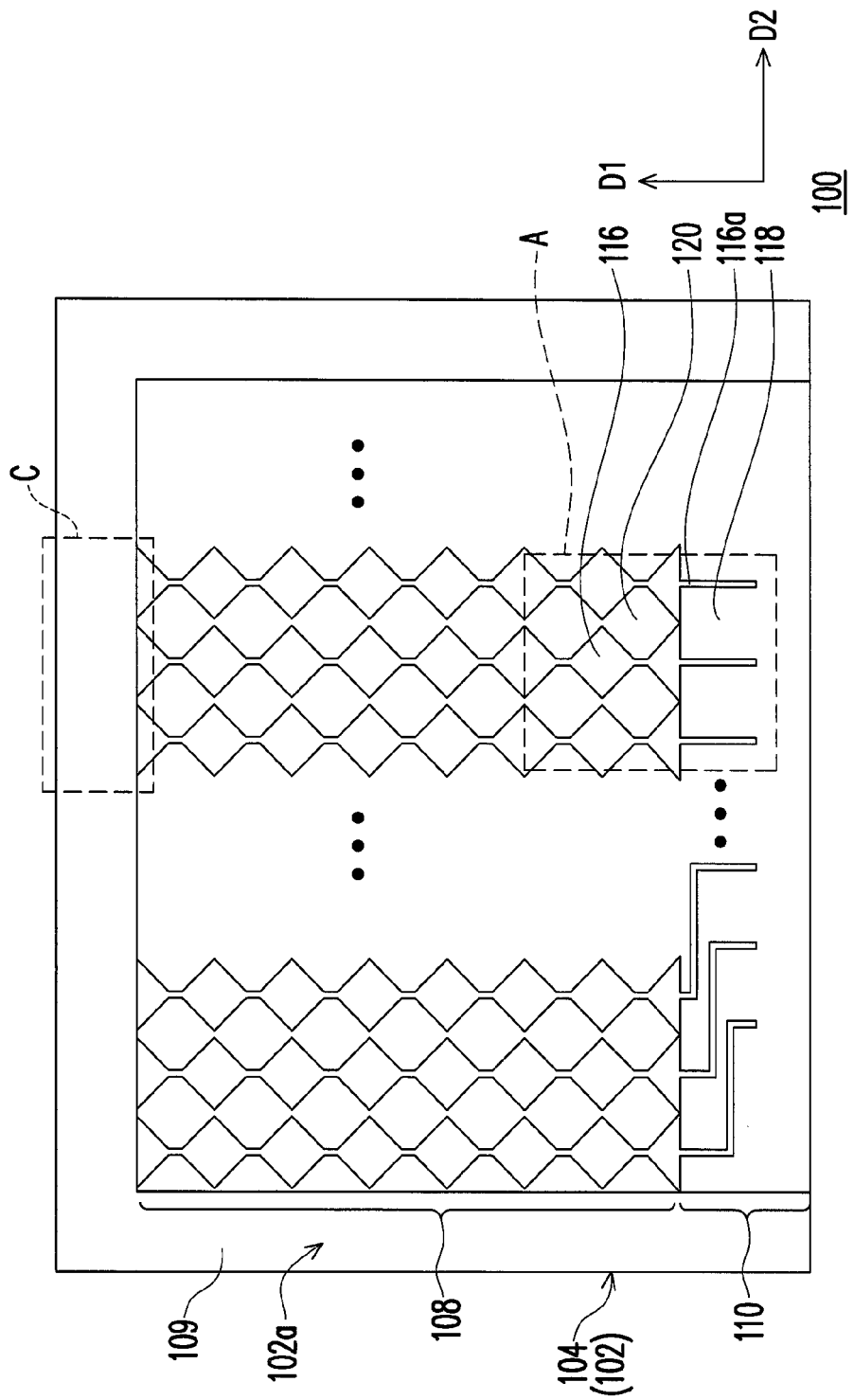
FIGS. 1A and 1B are a top schematic view and a bottom schematic view of a touch panel according to an embodiment of the disclosure, respectively.
Figure 1B:
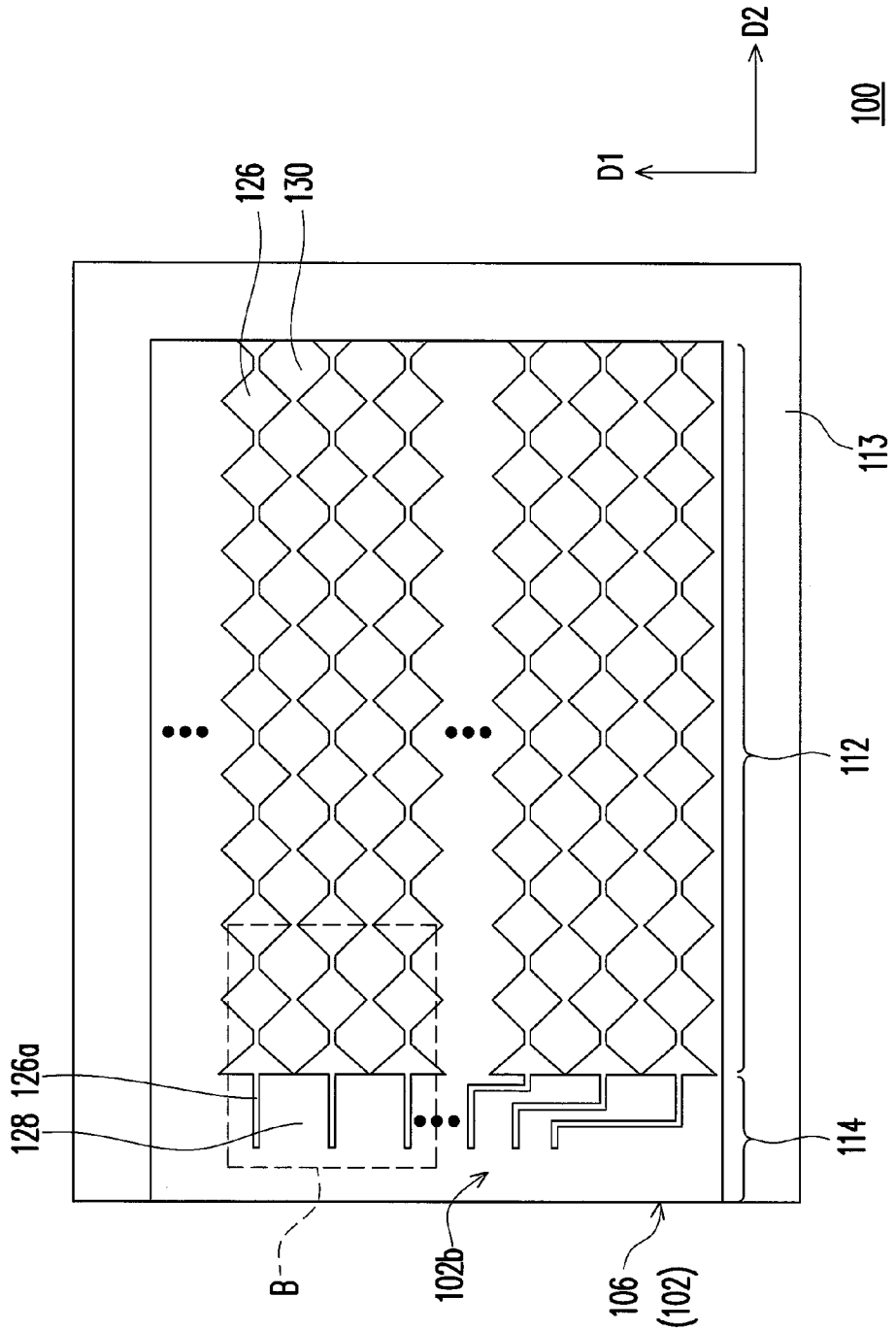
Figure 2A:
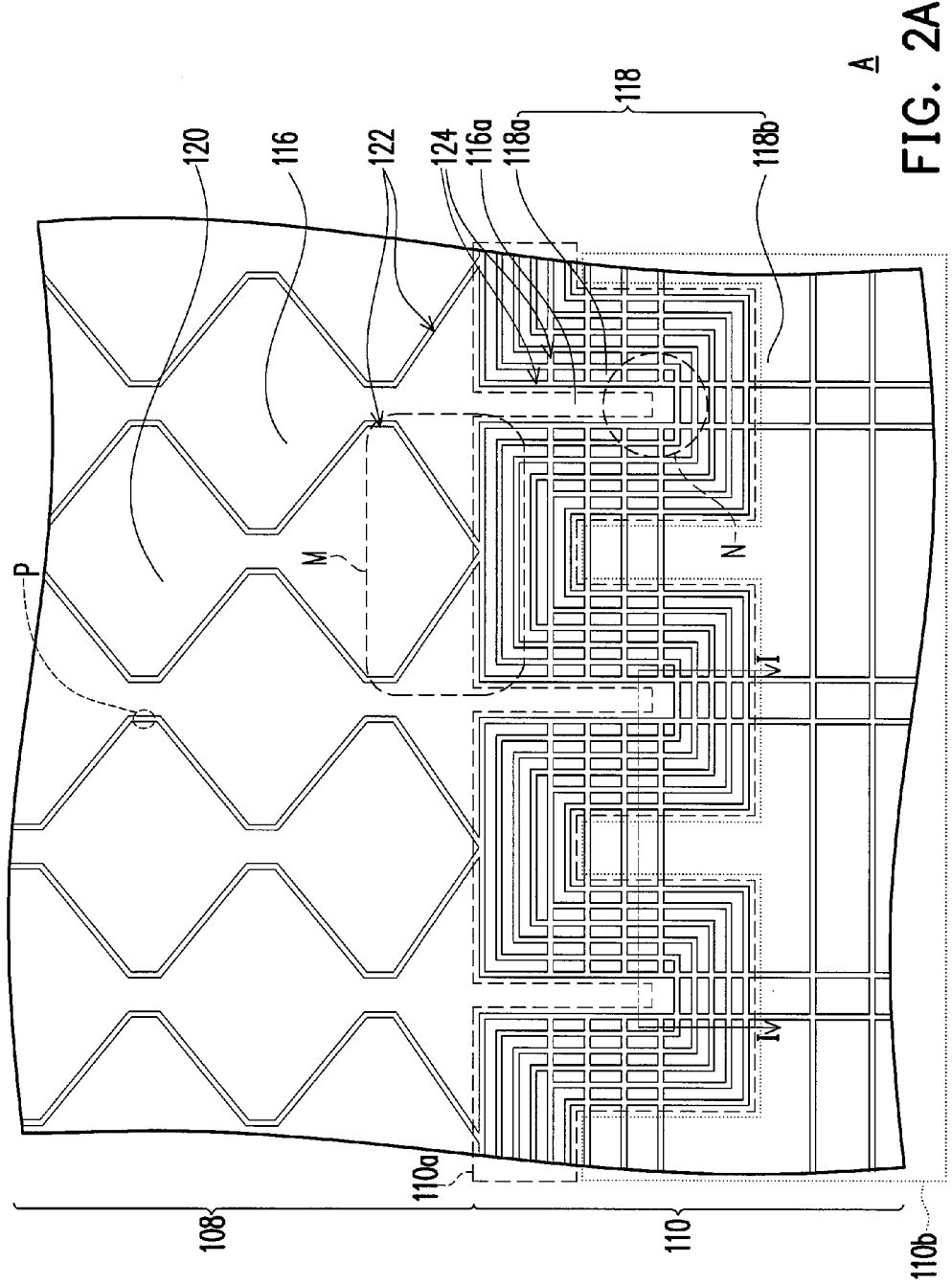
FIG. 2A is a magnified view of an area A in FIG. 1A.
Figure 2B:
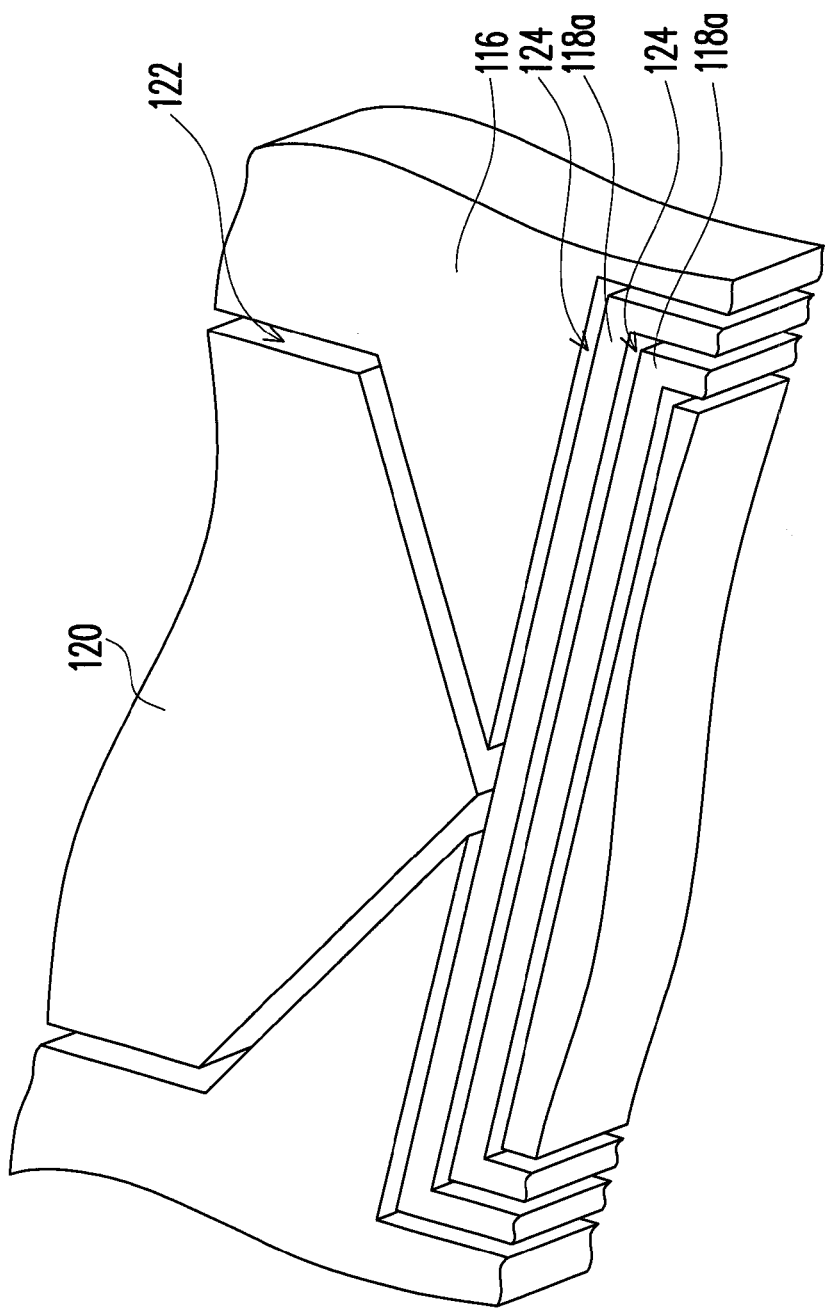
FIGS. 2B and 2C are magnified views of an area M and an area N in FIG. 2A, respectively.
Figure 2C:
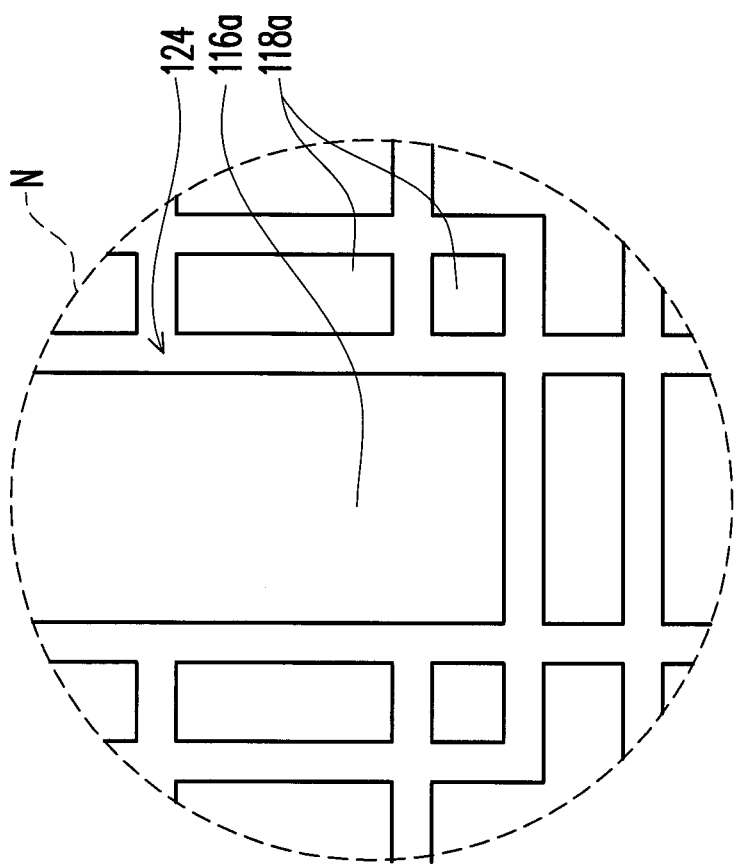
Figure 3:
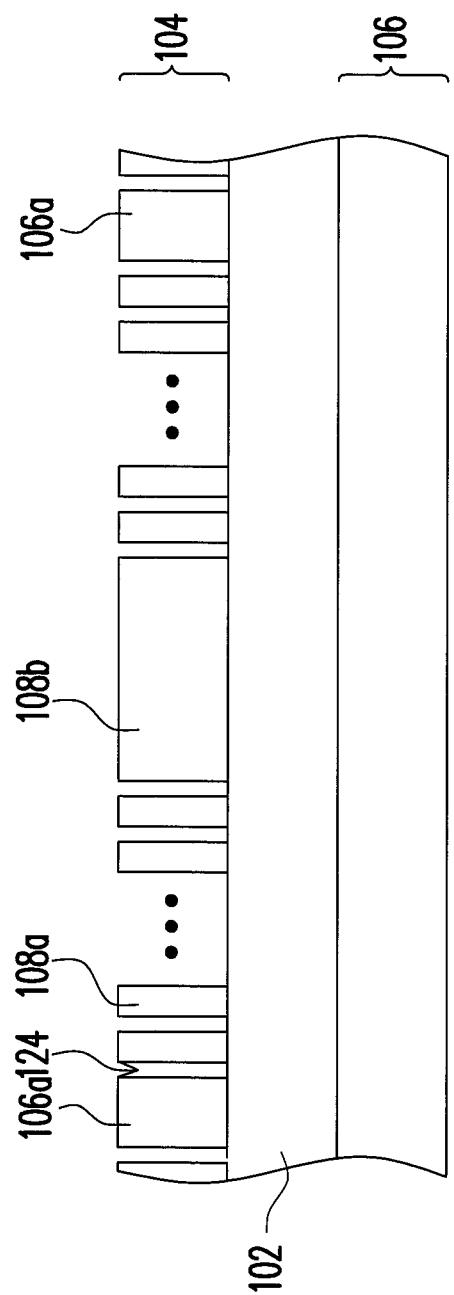
FIG. 3 is a schematic cross-sectional view along a line I-I in FIG. 2A.

FIGS. 1A and 1B are a top schematic view and a bottom schematic view of a touch panel according to an embodiment of the disclosure, respectively. FIG. 2A is a magnified view of an area A in FIG. 1A. FIGS. 2B and 2C are magnified views of an area M and an area N in FIG. 2A, respectively. FIG. 3 is a schematic cross-sectional view along a line I-I in FIG. 2A.

Please refer to both FIGS. 1A and 1B. A touch panel 100 includes a substrate 102, a first patterned conductive layer 104, and a second patterned conductive layer 106. The substrate 102 includes an upper surface 102a and a lower surface 102b opposite to the upper surface 102a. The first patterned conductive layer 104 is located on the upper surface 102a, and the second patterned conductive layer 106 is located on the lower surface 102b. The substrate 102 further includes a first sensing area 108, a first peripheral area 109, a first circuit bonding area 110, a second sensing area 112, a second peripheral area 113, and a second circuit bonding area 114. The first sensing area 108, the first peripheral area 109, and the first circuit bonding area 110 are located on the upper surface 102a, and the second sensing area 112, the second peripheral area 113, and the second circuit bonding area 114 are located on the lower surface 102b. Specifically, the first peripheral area 109 is, for example, located at a periphery outside the first sensing area 108 and the first circuit bonding area 110, and the second peripheral area 113 is, for example, located at a periphery outside the second sensing area 112 and the second circuit bonding area 114.

The substrate 102 is, for example, a transparent substrate, and a material thereof may be glass or plastic. Materials of the first patterned conductive layer 104 and the second patterned conductive layer 106 include, for example, transparent conductive materials such as indium tin oxide (ITO), indium zinc oxide (IZO), Al doped ZnO (AZO), Ga doped zinc oxide (GZO), indium oxide ($In_2O_3$), zinc oxide (ZnO), titanium dioxide ($TiO_2$), and tin dioxide ($SnO_2$).

Please refer to all of FIGS. 1A, 2A to 2C, and 3. The first patterned conductive layer 104 includes a plurality of first sensing series 116 located in the first sensing area 108 and a plurality of first dummy patterns 118 located in the first circuit bonding area 110. The first sensing series 116 extend along a first direction D1 and are arranged in parallel, as shown in FIG. 1A. A method of forming the first sensing series 116 and the first dummy patterns 118 includes, for example, forming a conductive layer on the upper surface 102a of the substrate 102, and patterning the conductive layer by laser etching, so as to form a plurality of isolation trenches in the conductive layer, exposing the upper surface 102a. According to an embodiment, an area of the upper surface 102a exposed by the isolation trenches accounts for 90% to 98% of the total area of the first patterned conductive layer 104, the exact percentage being determined by a line width of the isolation trenches.

In detail, the first patterned conductive layer 104 includes a plurality of first isolation trenches 122 located in the first sensing area 108 and a plurality of second isolation trenches 124 located in the first circuit bonding area 110 The first isolation trenches 122 define the plurality of first sensing series 116 electrically insulated from each other. The second isolation trenches 124 communicate with the first isolation trenches 122, so as to define a plurality of first terminals 116a connected to the first sensing series 116 and a plurality of the first dummy patterns 118 surrounding each of the first terminals 116a. According to an embodiment, a width of each of the first isolation trenches 122 and the second isolation trenches 124 is from 10 μm to 200 μm. In other words, a distance from each of the first terminals 116a to the adjacent first dummy pattern 118 is from 10 μm to 200 μm, and a distance between two adjacent first dummy patterns 118 is from 10 μm to 200 μm.

Hence, each of the first sensing series 116 is electrically insulated from each other and has the first terminal 116a extending into the first circuit bonding area 110. In other words, the first sensing series 116 are, for example, electrically connected to the first circuit bonding area 110 and an external circuit layer (not shown), so that electrical signals of the first sensing series 116 are transmitted from the circuit layer to a touch sensing chip, so as to control an electronic device. In practice, the above circuit layer may be, for example, a flexible printed circuit (FPC) which may be adhered to the first terminals 116a of the first sensing series 116 through an adhesive of an anisotropic conductive film (ACF).

According to an embodiment, the first patterned conductive layer 104 further includes a plurality of first dummy conductive patterns 120, and each of the first dummy conductive patterns 120 is located between two adjacent first sensing series 116 and is electrically insulated from the first sensing series 116. It should be noted that the first isolation trenches 122 not only define the first sensing series 116, but also define the plurality of first dummy conductive patterns 120, so that the first sensing series 116 and the first dummy conductive patterns 120 are, for example, fabricated from the same material. According to the above embodiment, by disposing the first dummy conductive patterns 120 between two adjacent first sensing series 116, overall uniformity of transparency of the touch panel is increased, thereby improving visual effects and making the first sensing series 116 less visible to the user.

Please refer to all of FIGS. 2A to 2C and 3. The first dummy patterns 118 surround each of the first terminals 116a and is electrically insulated from the each of the first terminals 116a due to an arrangement of the second isolation trenches 124. In addition, in the first circuit bonding area 110, there is a plurality of the dummy patterns 118 between every two adjacent first terminals 116a. The first circuit bonding area 110 may be further divided into a first area 110a and a second area 110b. The first area 110a surrounds a periphery of the first terminals 116a, and the second area 110b is located at an edge of the upper surface 100a of the substrate 100. The first area 110a is sandwiched between the first terminals 116a and the second area 110b. According to an embodiment, a distribution density of the second isolation trenches 124 in the first area 110a is greater than a distribution density of the second isolation trenches 124 in the second area 110b. In other words, an average size of first dummy patterns 118a in the first area 110a is smaller than an average size of first dummy patterns 118a in the second area 110b.

It should be noted that an extension direction of each of the second isolation trenches 124 may be horizontal, vertical, or oblique. In other words, a shape of the first dummy patterns 118 defined by the second isolation trenches 124 may be a rectangle, a trapezoid, a triangle, an L shape, a reversed U shape, or another suitable shape formed by crossing the second isolation trenches 124 of different directions. As shown in FIG. 2A, the first patterned conductive layer 104 according to the present embodiment includes a plurality of horizontal and vertical second isolation trenches 124 which cross each other. However, the disclosure is not limited to this configuration. According to another embodiment, the first patterned conductive layer 104 further includes a plurality of oblique second isolation trenches 124, so as to define first dummy patterns 118 of other shapes. The number of the second isolation trenches 124 is not limited to the number shown in the drawings. One of ordinary skill in the art is able to adjust this number according to requirements.

When the circuit layer is bonded to the first circuit bonding area 110 of the touch panel 100, even if misalignment occurs and pins on the circuit layer contact the conductive layer outside the first terminals 116a, no short circuits occur due to electrical connections between a plurality of the first sensing series 116. It should be noted that a plurality of first dummy patterns 118 which are electrically insulated from each other surrounds the periphery of the first terminals 116a, so that even if pins on the circuit layer contact one or more first dummy patterns 118, electrical connection between pins and other first dummy patterns 118 or other first terminals 116a do not occur. Moreover, the average size of the first dummy patterns 118a located at the periphery of the first terminals 116a are smaller, thereby facilitating prevention of problems such as short circuits caused by misalignment between pins on the circuit layer and the first terminals 116a.

Figure 4:
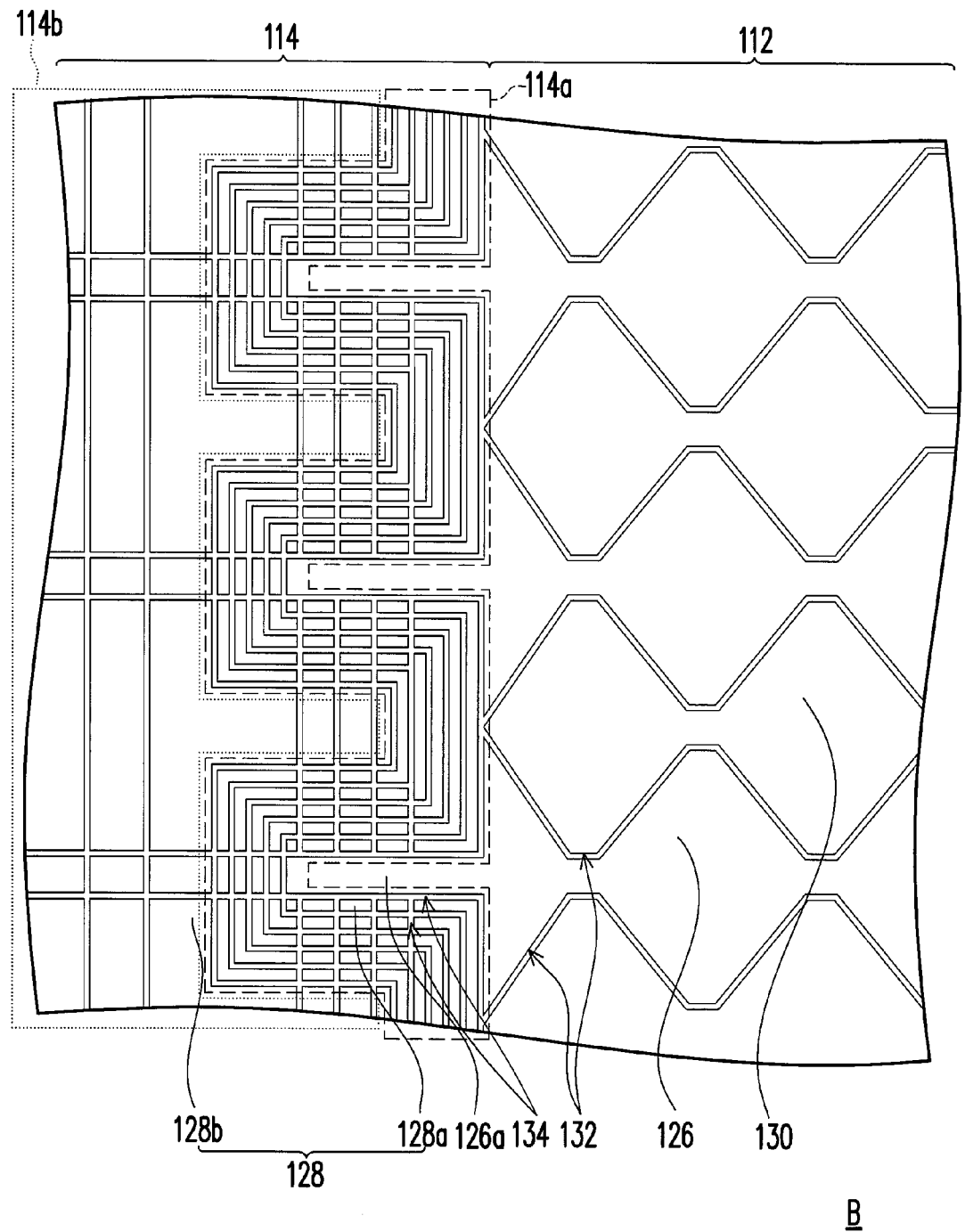
FIG. 4 is a magnified view of an area B in FIG. 1B.

According to an embodiment, the second patterned conductive layer 106 may also have a structure similar to that shown in FIG. 2A, so as to effectively prevent problems such as electrical connections between the sensing series or short circuits caused by misalignment between the pins on the circuit layer and the terminals of the sensing series. The following describes the touch panel with a top view. FIG. 4 is a magnified view of an area B in FIG. 1B.

Please also refer to both FIGS. 1B and 4. The second patterned conductive layer 106 includes a plurality of second sensing series 126 located in the second sensing area 112 and a plurality of second dummy patterns 128 located in the second circuit bonding area 114. The second sensing series 126 extend along a second direction D2 and are arranged in parallel, and the first direction D1 is not parallel to the second direction D2, as shown in FIG. 1B. According to the present embodiment, the first direction D1 and the second direction D2 are substantially perpendicular to each other. The first sensing series 116 and the second sensing series 126 are respectively located on the upper surface 102a and the lower surface 102b of the substrate and are electrically insulated from each other. Therefore, through touching, coupling capacitance at an overlapping area between the first sensing series 116 and the second sensing series 126 is able to be changed to generate a signals, so as to realize capacitive touch sensing functions.

Similarly, a method of forming the second sensing series 126 and the second dummy patterns 128 includes, for example, forming another conductive layer on the lower surface 102b of the substrate 102, and patterning the conductive layer by laser etching, so as to form a plurality of third isolation trenches 132 and fourth isolation trenches 134 in the conductive layer, exposing the lower surface 102b. According to an embodiment, an area of the lower surface 102b exposed by the third isolation trenches 132 and the fourth isolation trenches 134 accounts for 90% to 98% of the total area of the second patterned conductive layer 106, the exact percentage being determined by a line width of the isolation trenches.

The third isolation trenches 132 are located in the second sensing area 112, and the fourth isolation trenches 134 are located in the second circuit bonding area 114. The third isolation trenches 132 define the plurality of second sensing series 126 electrically insulated from each other and the second dummy conductive patterns 130. The fourth isolation trenches 134 communicate with the third isolation trenches 132, so as to define a plurality of second terminals 126a connected to the second sensing series 126 and a plurality of the second dummy patterns 128 surrounding each of the second terminals 126a. According to an embodiment, a width of each of the third isolation trenches 132 and the fourth isolation trenches 134 is from 10 μm to 200 μm. In other words, a distance from each of the second terminals 126a to the adjacent second dummy pattern 128 is from 10 μm to 200 μm, and a distance between two adjacent second dummy patterns 128 is from 10 μm to 200 μm.

Each of the second sensing series 126 defined by the third isolation trenches 132 is electrically insulated from each other and has the second terminal 126a extending into the second circuit bonding area 114. In other words, the pins on the circuit layer (not shown) are, for example, electrically connected to the second terminals 126a of the second sensing series 126, so that electrical signals of the second sensing series 126 are transmitted from the circuit layer to the touch sensing chip, so as to control the electronic device. The second dummy conductive patterns 130 also defined by the third isolation trenches 132 are located between every two second sensing series 126. According to the above embodiment, by disposing the second dummy conductive patterns 130 between two adjacent second sensing series 126, overall uniformity of transparency of the touch panel is increased, thereby improving visual effects and making the first sensing series 116 less visible to the user.

Referring to FIG. 4, the first dummy patterns 128 defined by the fourth isolation trenches 134 surround each of the second terminals 126a and is electrically insulated from the each of the second terminals 126a. In the second circuit bonding area 114, there is a plurality of the second dummy patterns 128 between every two adjacent second terminals 126a. Moreover, the second circuit bonding area 114 may be further divided into a third area 114a and a fourth area 114b. The first area 114a surrounds a periphery of the second terminals 126a, and the fourth area 114b is located at an edge of the lower surface 100b of the substrate 100. The third area 114a is sandwiched between the second terminals 126a and the fourth area 114b. According to an embodiment, a distribution density of the third isolation trenches 132 in the third area 114a is greater than a distribution density of the fourth isolation trenches 134 in the fourth area 114b. In other words, an average size of the second dummy patterns 128a in the third area 114a is smaller than an average size of the second dummy patterns 128b in the fourth area 114b.

Similarly, an extension direction of each of the fourth isolation trenches 134 may be horizontal, vertical, or oblique. In other words, a shape of the second dummy patterns 128 defined by the fourth isolation trenches 134 may be a rectangle, a trapezoid, a triangle, an L shape, a reversed U shape, or another suitable shape formed by crossing the fourth isolation trenches 134 of different directions. According to the disclosure, the fourth isolation trenches 134 are not limited to the horizontal and vertical cross arrangement shown in FIG. 4. According to another embodiment, the second patterned conductive layer 106 further includes a plurality of oblique fourth isolation trenches 134, so as to define the second dummy patterns 128 of other shapes. The number of the fourth isolation trenches 134 is not limited to the number shown in the drawings. One of ordinary skill in the art is able to adjust this number according to requirements.

Figure 5:
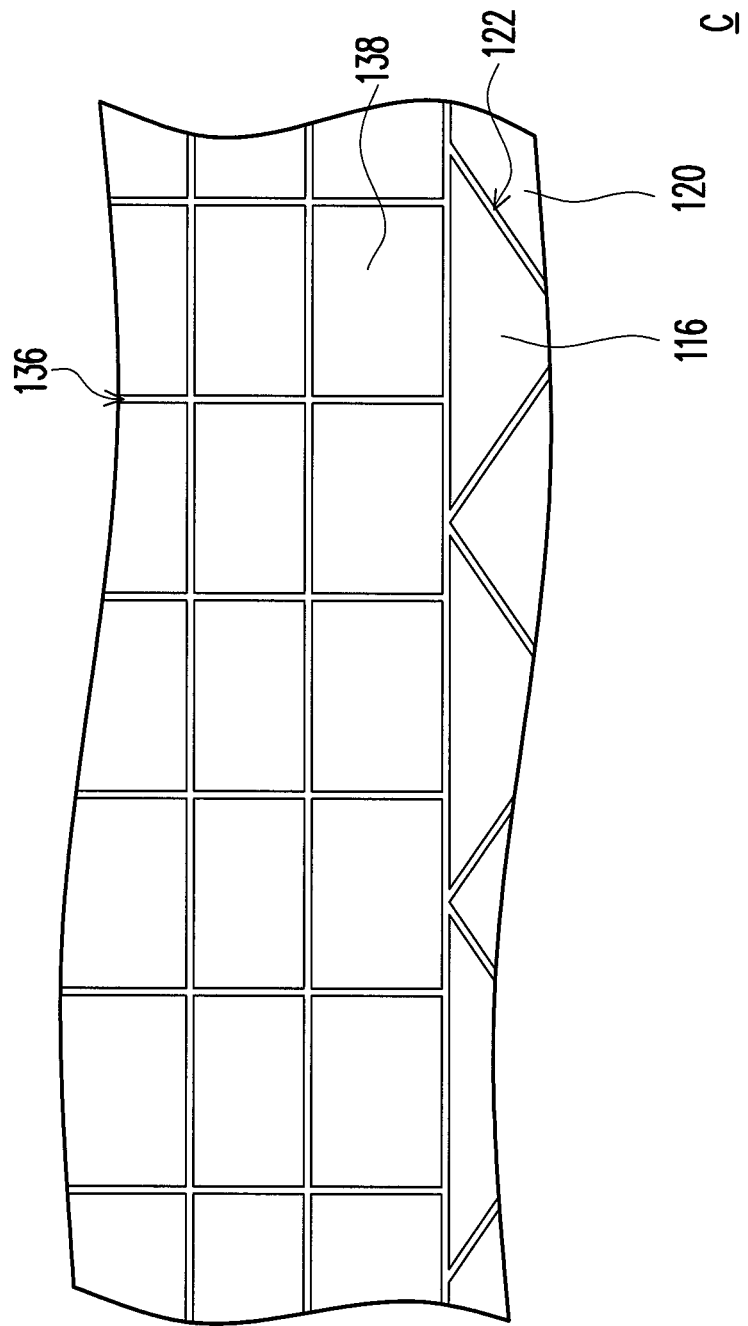
FIG. 5 is a magnified view of an area C in FIG. 1A.

Furthermore, according to an embodiment, in addition to the first isolation trenches 122, the second isolation trenches 124, the third isolation trenches 132, and the fourth isolation trenches 134, laser etching may similarly be used to pattern the first patterned conductive layer 104 and the second patterned conductive layer 106, so as to form a plurality of peripheral isolation trenches in the first peripheral area 109 and the second peripheral area 113. The following describes the touch panel with a top view. FIG. 5 is a magnified view of an area C in FIG. 1A.

Please refer to both FIGS. 1A and 5. The first patterned conductive layer 104 may further include a plurality of first peripheral isolation trenches 136 located in the first peripheral area 109. The first peripheral isolation trenches 136 define a plurality of first dummy peripheral patterns 138. The first dummy peripheral patterns 138 are, for example, electrically insulated from each other and are located at the peripheral edge of the first sensing area 108. The first dummy peripheral patterns 138 are electrically insulated from the first sensing series 116 located in the first sensing area 108, so that cross-talk between the first sensing series 116 is reduced. It should be noted that an extension direction of each of the first peripheral isolation trenches 136 may be horizontal, vertical, or oblique, and a shape of the first dummy peripheral patterns 138 defined by the first peripheral isolation trenches 136 may be a rectangle, a trapezoid, a triangle, an L shape, a reversed U shape, or another suitable shape. Moreover, numbers, shapes, sizes, and distribution densities of the first peripheral isolation trenches 136 and the first dummy peripheral patterns are not limited to those shown in the drawings, but are adjustable by one of ordinary skill in the art according to requirements.

According to another embodiment, the second peripheral area 113 of the second patterned conductive layer 106 may also have a structure similar to that shown in FIG. 5. In other words, the second patterned conductive layer 106 may also include a plurality of second peripheral isolation trenches (not shown) in the second peripheral area 113, so as to define a plurality of second dummy peripheral patterns (not shown) which are electrically insulated from the second sensing series 126, thereby reducing cross-talk between the second sensing series 126.

It should be noted that the above embodiment is mainly intended to describe in detail the first dummy patterns 118 and the second isolation trenches 124 in the first circuit bonding area 110 and the second dummy patterns 128 and the fourth isolation trenches 134 in the second circuit bonding area 114, so that one of ordinary skill in the art is capable of implementation, but is not intended to limit the scope of the disclosure. Structures, arrangements, and numbers of other elements of the touch panel 100 such as the first sensing series 116 and the second sensing series 126 are not limited to the configurations shown in FIGS. 1A and 1B, but may be adjusted by one of ordinary skill in the art.

Figure 6A:
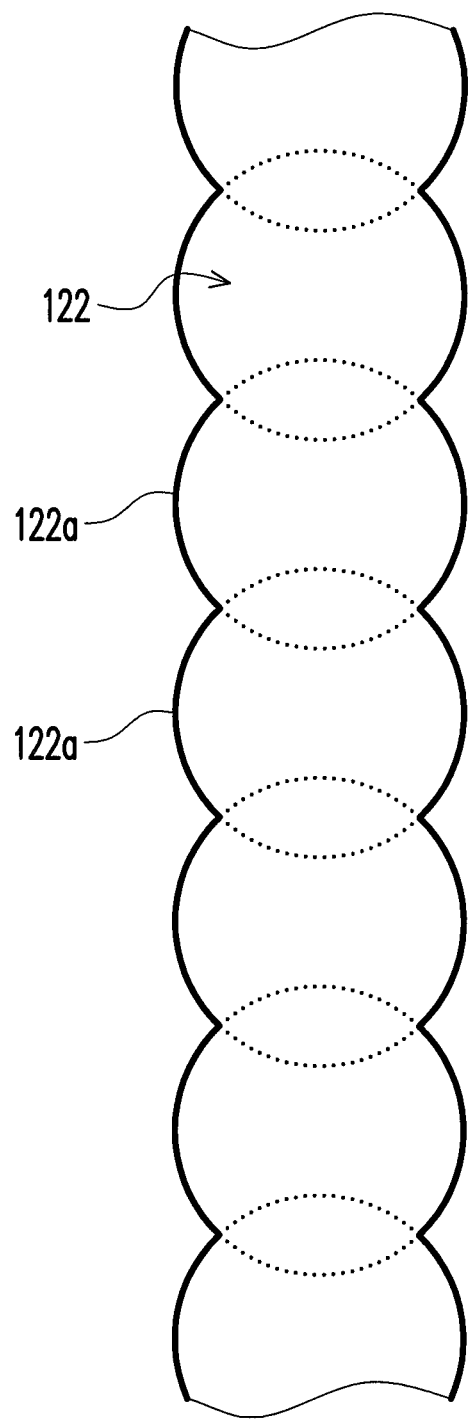
FIGS. 6A, 6B, and 6C are magnified views of an area P in FIG. 2A according to different embodiments.
Figure 6B:
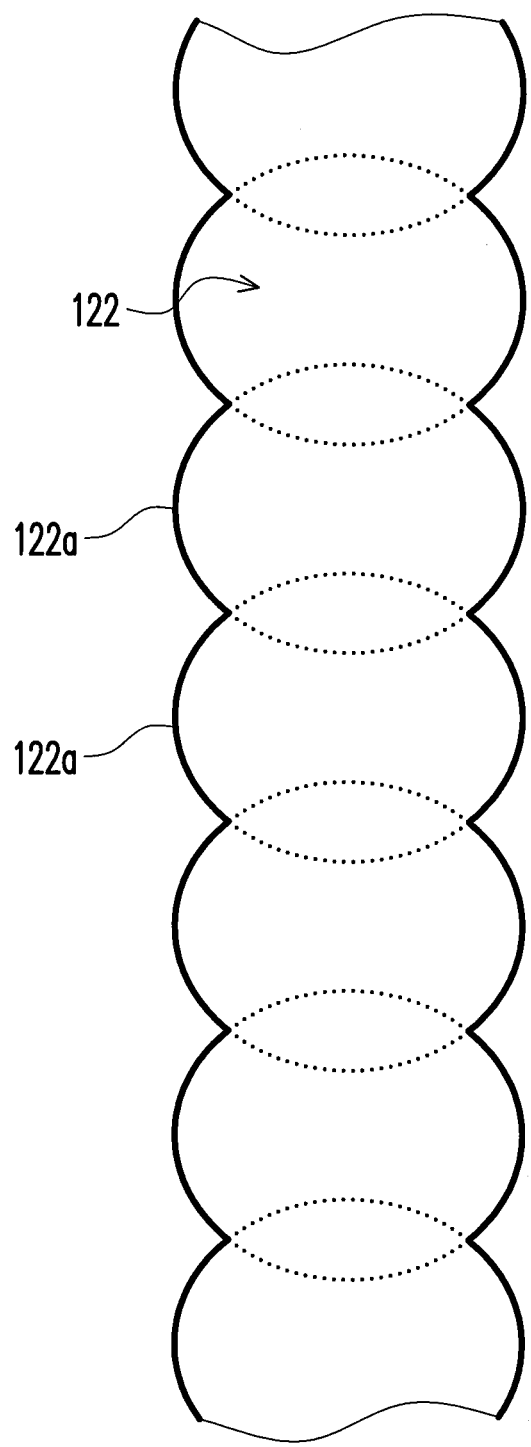
Figure 6C:
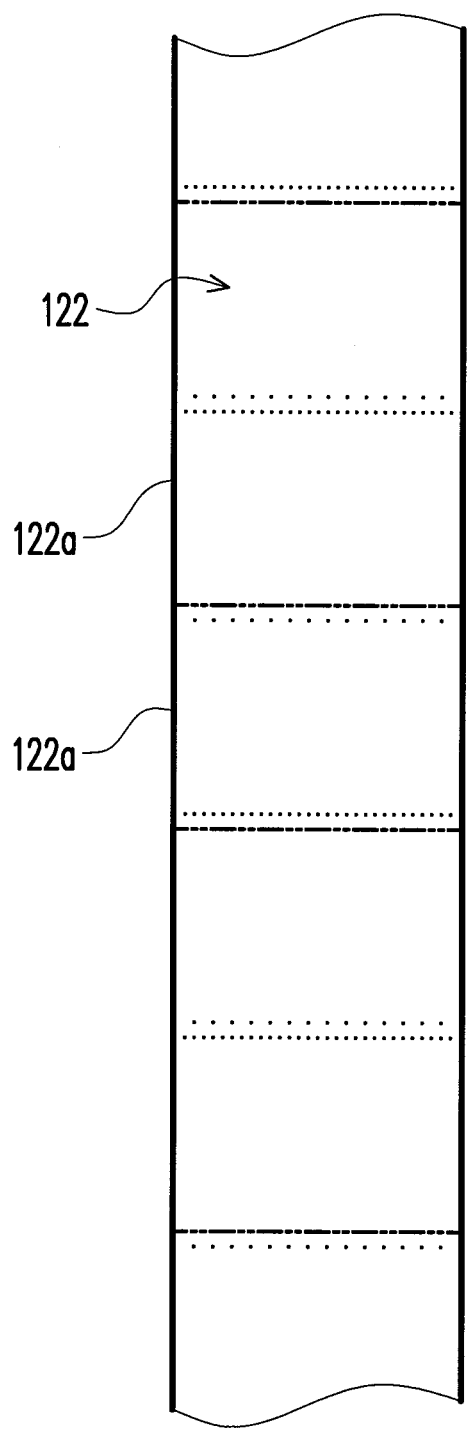

Specifically, although edge lines of the first isolation trenches 122, the second isolation trenches 124, the third isolation trenches 132, the fourth isolation trenches 134, and the first peripheral isolation trenches 136 according to the above embodiment are straight, the disclosure is not limited to this configuration. The following uses the first isolation trenches 122 in FIG. 2A as an example to describe in detail the isolation trenches according to the embodiments of the disclosure. FIGS. 6A, 6B, and 6C are magnified views of an area P in FIG. 2A according to different embodiments.

Please refer to all of FIGS. 6A to 6C. According to an embodiment, the first isolation trenches 122 may be formed by a plurality of repeating patterns 122a. Each of the repeating patterns 122a partially overlaps with another repeating pattern, so as to form the first isolation trenches 122 which communicate with each other. The repeating patterns 122a are, for example, circular (as shown in FIG. 6A), oval (as shown in FIG. 6B), rectangular (as shown in FIG. 6C), or of any other shape. In other words, when examined in detail, the edge lines of the first isolation trenches 122 are not straight but include, for example, continuous arcs. It should be noted that since laser etching is used to pattern the conductive layer to form the first isolation trenches 122, during the process of laser etching, consecutive pulses of laser form continuous trenches when removing the material of the conductive layer, and a trench formed by every single laser pulse is a single repeating pattern 122a in FIGS. 6A to 6C.

According to another embodiment, the second isolation trenches 124, the third isolation trenches 132, the fourth isolation trenches 134, the first peripheral isolation trenches 136, and the second peripheral isolation trenches (not shown) may be formed by a plurality of repeating patterns which may be circular, oval, rectangular, or of any other shape, so that the edge lines of these isolation trenches are not straight lines when examined in detail. One of ordinary skill in the art should readily know the applications and possible modifications according to the above embodiments, so that said applications and possible modifications are not described.

In summary, the touch panel according to the disclosure includes a plurality of communicating isolation trenches formed in the conductive layer, so as to individually define a plurality of sensing series, a plurality of dummy conductive patterns, and a plurality of dummy patterns. By making the dummy patterns surround the periphery of the terminal of each of the sensing series, and disposing a plurality of electrically insulated dummy patterns between the terminals of every two adjacent sensing series, short circuits of electrical connections between a plurality of the sensing series caused by the pins on the circuit layer contacting the conductive layer outside the terminals are prevented.

Furthermore, the touch panel according to the disclosure is easily integrated into existing manufacturing processes, so that the overall manufacturing processes are simple and product yields are increased.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch panel, comprising:
   a substrate, comprising an upper surface, a first sensing area, a first circuit bonding area, and a lower surface opposite to the upper surface, the first sensing area and the first circuit bonding area being located on the upper surface;
   a first patterned conductive layer, located on the upper surface, the first patterned conductive layer comprising:
   a plurality of first sensing series, located in the first sensing area, each of the first sensing series being electrically insulated from each other and having a first terminal extending into the first circuit bonding area; and
   a plurality of first dummy patterns, located in the first circuit bonding area, the first dummy patterns surrounding each of the first terminals and being electrically insulated from the first terminals, wherein in the first circuit bonding area, a plurality of the first dummy patterns are located between two adjacent ones of the first terminals;
   a second patterned conductive layer, located on the lower surface.

2. The touch panel as claimed in claim 1, wherein a distance from each of the first terminals to an adjacent one of the first dummy patterns is from 10 μm to 200 μm, and a distance between two adjacent ones of the first dummy patterns is from 10 μm to 200 μm.

3. The touch panel as claimed in claim 1, wherein the first circuit bonding area comprises a first area and a second area, the first area surrounds the first terminals and are located between the first terminals and the second area, and an average size of the first dummy patterns in the first area is smaller than an average size of the first dummy patterns in the second area.

4. The touch panel as claimed in claim 1, wherein the first patterned conductive layer further comprises a plurality of first dummy conductive patterns, each of the first dummy conductive patterns being located between two adjacent ones of the first sensing series and electrically insulated from the first sensing series.

5. The touch panel as claimed in claim 1, wherein the substrate comprises a first peripheral area located on the upper surface, the first patterned conductive layer further comprises a plurality of first dummy peripheral patterns located in the first peripheral area, and the first dummy peripheral patterns and the first sensing series are electrically insulated from each other.

6. The touch panel as claimed in claim 1, wherein the substrate comprises a second sensing area and a second circuit bonding area, the second sensing area and the second circuit bonding area are located on the lower surface, and the second patterned conductive layer comprises:
  a plurality of second sensing series, located in the second sensing area, each of the second sensing series being electrically insulated from each other and having a second terminal extending into the second circuit bonding area; and
  a plurality of second dummy patterns, located in the second circuit bonding area, the second dummy patterns surrounding each of the second terminals and being electrically insulated from the second terminals, wherein in the second circuit bonding area, a plurality of the second dummy patterns are located between two adjacent ones of the second terminals.

7. The touch panel as claimed in claim 6, wherein a distance from each of the second terminals to an adjacent one of the second dummy patterns is from 10 μm to 200 μm, and a distance between two adjacent ones of the second dummy patterns is from 10 μm to 200 μm.

8. The touch panel as claimed in claim 6, wherein the second circuit bonding area comprises a third area and a fourth area, the third area surrounds the second terminals and are located between the second terminals and the fourth area, and an average size of the second dummy patterns in the third area is smaller than an average size of the second dummy patterns in the fourth area.

9. The touch panel as claimed in claim 6, wherein the second patterned conductive layer further comprises a plurality of second dummy conductive patterns, each of the second dummy conductive patterns being located between two adjacent ones of the second sensing series and electrically insulated from the second sensing series.

10. The touch panel as claimed in claim 6, wherein the substrate comprises a second peripheral area located on the lower surface, the second patterned conductive layer further comprises a plurality of second dummy peripheral patterns located in the second peripheral area, and the second dummy peripheral patterns and the second sensing series are electrically insulated from each other.

11. A touch panel, comprising:
  a substrate, comprising an upper surface, a first sensing area, a first circuit bonding area, and a lower surface opposite to the upper surface, the first sensing area and the first circuit bonding area being located on the upper surface;
  a first patterned conductive layer, located on the upper surface, wherein the first patterned conductive layer comprises a plurality of first isolation trenches located in the first sensing area and a plurality of second isolation trenches located in the first circuit bonding area, the first isolation trenches define a plurality of first sensing series electrically insulated from each other and first dummy conductive patterns, and the second isolation trenches communicate with the first isolation trenches, so as to define a plurality of first terminals connected to the first sensing series and a plurality of first dummy patterns surrounding each of the first terminals, and a plurality of the first dummy patterns is located between two adjacent ones of the first terminals; and
  a second patterned conductive layer, located on the lower surface.

12. The touch panel as claimed in claim 11, wherein an extension direction of each of the second isolation trenches is horizontal, vertical, or oblique.

13. The touch panel as claimed in claim 11, wherein a width between each of the first isolation trenches and each of the second isolation trenches is from 10 μm to 200 μm.

14. The touch panel as claimed in claim 11, wherein the first circuit bonding area comprises a first area and a second area, the first area surrounds the first terminals and are located between the first terminals and the second area, and a distribution density of the second isolation trenches in the first area is greater than a distribution density of the second isolation trenches in the second area.

15. The touch panel as claimed in claim 11, wherein the substrate comprises a first peripheral area located on the upper surface, the first patterned conductive layer comprises a plurality of first peripheral isolation trenches located in the first peripheral area, the first peripheral isolation trenches define a plurality of first dummy peripheral patterns, and the first peripheral isolation trenches and the first dummy peripheral patterns are electrically insulated from each other.

16. The touch panel as claimed in claim 11, wherein the substrate comprises a second sensing area and a second circuit bonding area, the second sensing area and the second circuit bonding area are located on the lower surface, the second patterned conductive layer comprises a plurality of third isolation trenches located in the second sensing area and a plurality of fourth isolation trenches located in the second circuit bonding area, the third isolation trenches define a plurality of second sensing series electrically insulated from each other and second dummy conductive patterns, and the fourth isolation trenches communicate with the third isolation trenches, so as to define a plurality of second terminals connected to the second sensing series and a plurality of second dummy patterns surrounding each of the second terminals, and a plurality of the second dummy patterns is located between every two adjacent ones of the second terminals.

17. The touch panel as claimed in claim 16, wherein an extension direction of each of the fourth isolation trenches is horizontal, vertical, or oblique.

18. The touch panel as claimed in claim 16, wherein a width between each of the third isolation trenches and each of the fourth isolation trenches is from 10 μm to 200 μm.

19. The touch panel as claimed in claim 16, wherein the second circuit bonding area comprises a third area and a fourth area, the third area surrounds the second terminals and are located between the second terminals and the fourth area, and a distribution density of the fourth isolation trenches in the third area is greater than a distribution density of the fourth isolation trenches in the fourth area.

20. The touch panel as claimed in claim 16, wherein the substrate comprises a second peripheral area located on the lower surface, the second patterned conductive layer comprises a plurality of second peripheral isolation trenches located in the second peripheral area, the second peripheral isolation trenches define a plurality of second dummy peripheral patterns, and the second peripheral isolation trenches and the second dummy peripheral patterns are electrically insulated from each other.

21. A touch panel, comprising:
- a substrate, comprising an upper surface, a first sensing area, a first circuit bonding area, and a lower surface opposite to the upper surface, the first sensing area and the first circuit bonding area being located on the upper surface;
- a first patterned conductive layer, located on the upper surface, the first patterned conductive layer comprising:
  - a plurality of first sensing series, located in the first sensing area, each of the first sensing series being electrically insulated from each other and having a first terminal extending into the first circuit bonding area; and
  - a plurality of isolation trenches which electrically insulate the first sensing series from each other, wherein the isolation trenches are formed by a plurality of repeating patterns; and
- a second patterned conductive layer, located on the lower surface.

22. The touch panel as claimed in claim 21, wherein a shape of each of the repeating patterns comprises a circle, an oval, or a rectangle.

* * * * *